(12) United States Patent
Adair

(10) Patent No.: US 6,203,048 B1
(45) Date of Patent: Mar. 20, 2001

(54) STOWABLE BALL MOUNT TRAILER HITCH

(76) Inventor: Edward C. Adair, Hc 1 Box 535 H, Bunnell, FL (US) 32110

( * ) Notice: Subject to any disclaimer, the term of this patent is extended or adjusted under 35 U.S.C. 154(b) by 0 days.

(21) Appl. No.: 09/603,078

(22) Filed: Jun. 26, 2000

Related U.S. Application Data

(63) Continuation-in-part of application No. 09/422,391, filed on Oct. 21, 1999, now abandoned.

(51) Int. Cl.$^7$ ....................................................... B60D 1/52

(52) U.S. Cl. ........................................ 280/491.5; 280/511

(58) Field of Search ............................. 280/491.1, 491.3, 280/491.5, 504, 511

(56) References Cited

U.S. PATENT DOCUMENTS

| | | | |
|---|---|---|---|
| 4,109,930 | 8/1978 | Pilhall | 280/491 B |
| 4,807,900 | 2/1989 | Tate | 280/491.3 |
| 5,000,474 | * 3/1991 | Kristensen | 280/491.5 |
| 5,104,138 | * 4/1992 | Allen | 280/433 |
| 5,423,566 | * 6/1995 | Warrington et al. | 280/415.1 |
| 5,431,425 | 7/1995 | Klinkman | 280/491.1 |
| 5,475,279 | 12/1995 | Klemetsen | 280/415.1 |

* cited by examiner

*Primary Examiner*—J. J. Swann
*Assistant Examiner*—Michael Cuff
(74) *Attorney, Agent, or Firm*—Robert O. Wright

(57) ABSTRACT

A method and apparatus, including a combination linch-pin stowage adapter, for positioning a ball mount member of most class 2, 3, & 4 trailer hitches in both an operating and non operating retracted position on a trailer hitch receiver mounted underneath a vehicle is shown.

20 Claims, 2 Drawing Sheets

US 6,203,048 B1

STOWABLE BALL MOUNT TRAILER HITCH

FIELD OF INVENTION

This application is a continuation-in-part of application Ser. No. 09/422,391 filed Oct. 21, 1999. This invention relates to trailer hitches and more particularly to a method and means for stowing a ball mount member with a hitch receiver mounted on a vehicle.

BACKGROUND OF INVENTION

Trailer hitches conventionally have been mounted to the frames of vehicles at the rear adjacent the bumper. Typically they have consisted of an elongated hollow hitch receiver mounted on the vehicle and a ball mount member adapted to be selectively inserted into the receiver and secured with the towing ball extending rearward in operative position. With no trailer attached the ball mount has presented a hazard to persons passing the rear of the vehicle and accordingly the ball mount is usually detached when not in use.

Once removed the ball mount must be stowed inside the vehicle or risk loss and/or unavailability when needed. When stored in the vehicle the ball mount frequently becomes a deadly missile in the event of an accident.

PRIOR ART

Various attempts have been made to provide a ball mount that can be rotated from a towing position to a retracted position such as shown in U.S. Pat. No. 4,807,900 to Tate. Others have suggested a resilient cover for bumper mounted hitches while fifth wheel mounts that retract into the truck bed are known. None of the art has addressed the safe stowage of a removable ball mount in readily accessible position with the hitch receiver as shown herein.

OBJECTS AND SUMMARY OF INVENTION

Accordingly it is an object of the present invention to provide a method and means for stowing a ball mount when not in use in a safe position out of the way of peoples legs and yet available for immediate installation in operative position.

It is another object of the present invention to provide a means for mounting a ball mount in close juxtaposition with the hitch receiver of a trailer hitch apparatus mounted on a vehicle.

It is another object of the present invention to provide a combination stowage adapter and linch-pin for a ball mount for positioning of a ball mount in operative position in a hitch receiver and also in a retracted stowed position.

It is a further object of the present invention to provide a stowage adapter for attachment to a ball mount to permit mounting of the assembled pieces in a retracted position on a trailer hitch apparatus.

It is a still further object of the present invention to provide a stowage adapter that is simple and economical to manufacture, safe and easy to use, and in stowage mode positions a ball mount in a fully retracted position so that it can not be contacted accidentally by a persons legs as they walk behind a vehicle.

It is yet a further object of the present invention to provide a method and device for stowage of a ball mount with its hitch receiver installed on a vehicle that will work with most known class 2, 3, & 4, trailer hitches.

These and other and further objects are accomplished in an embodiment of the present invention in which a stowage adapter has a body portion sized to telescopically fit the distal end of a ball mount, and carries at the other end a cylindrical rod with a length and diameter sufficient to fit transversely through the usual holes in the sides of a hitch receiver to function alternately as the usual hitch linch-pin and as a stowage adapter to position a ball mount in a retracted position.

DESCRIPTION OF A PREFERRED EMBODIMENT

Figure 1:
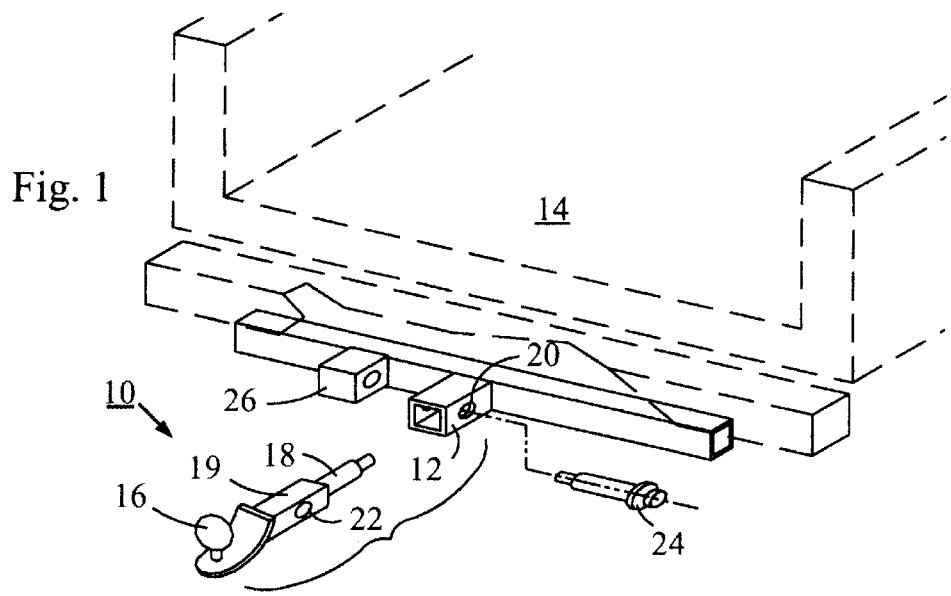
FIG. 1 is an exploded perspective view of a ball mount according to the present invention in operative position in a hitch receiver installed under a vehicle with the vehicle shown in phantom.

Referring now to FIG. 1 there is shown an exploded view of a ball mount 10 installed in a hitch receiver 12 mounted on the underside of a pickup truck 14. Ball mount 10 carries the usual hitch ball 16 in a hole on its outer end which typically is a curved plate and the distal end 19 of the ball mount is sized to telescopically fit within receiver 12 on truck 14 and has extending axially therefrom a stowage adapter in the form of rod 18.

A pair of transverse holes 20 are provided in the sides of receiver 12 and corresponding holes 22 are provided in mount 10. The holes 20 and 22 are position so as to align when the mount 10 is in operative position within receiver 12. A linch-pin 24 is inserted through the assembled mount and receiver to secure same for towing. A suitable latching member such as lock 26 may be provided to keep linch-pin 24 in proper position.

Figure 2:
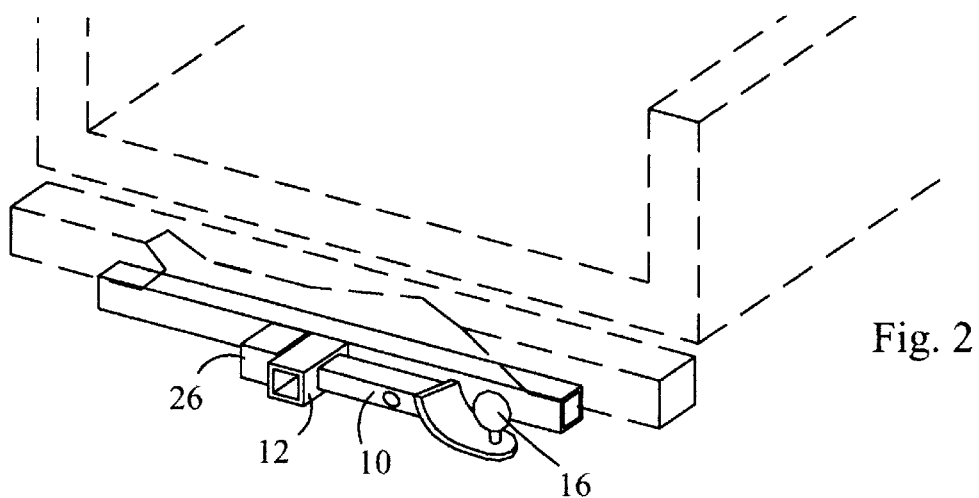
FIG. 2 is a view similar to FIG. 1 with the ball mount installed in the stowed position.

FIG. 2 shows the ball mount 10 stowed in non operating retracted position on receiver 12 with rod 18 inserted through holes 20 and lock 26 applied. As can be seen ball mount 10 with ball 16 is safely stowed out of the way underneath the bumper of the truck. Depending on the exact configuration of the truck, the receiver mounting and the size of the ball mount, it can be mounted with the ball up (as shown) or with the ball toward the front, rear or ground. Stowed as shown the ball mount 10 is always available when needed (i.e. not at home in the garage). Similarly the mount is not rattling around in the box of the truck with the risk of loss, nor is it loose in the cab where it could become a deadly weapon in an accident.

Figure 3:
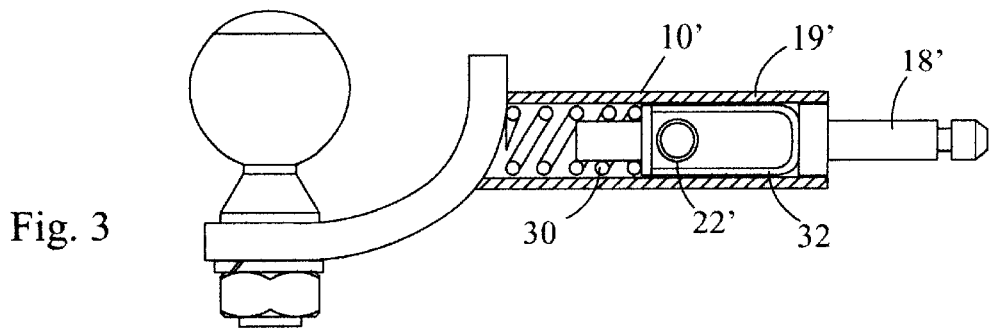
FIG. 3 is a side view partially broken away showing a ball mount with a spring biased retractable rod.

Referring now to FIG. 3 a hollow ball mount 10' is shown with rod 18' spring urged into the extended position by spring 30 and bail 32. Operation of the device is the same as that of the device in FIGS. 1 & 2 except that in installations where there is an obstruction at the forward end of the hitch receiver, such as a spare tire, the rod 18' will retract into the ball mount as the ball mount is positioned in towing position in a receiver mounted under a vehicle.

Figure 4:
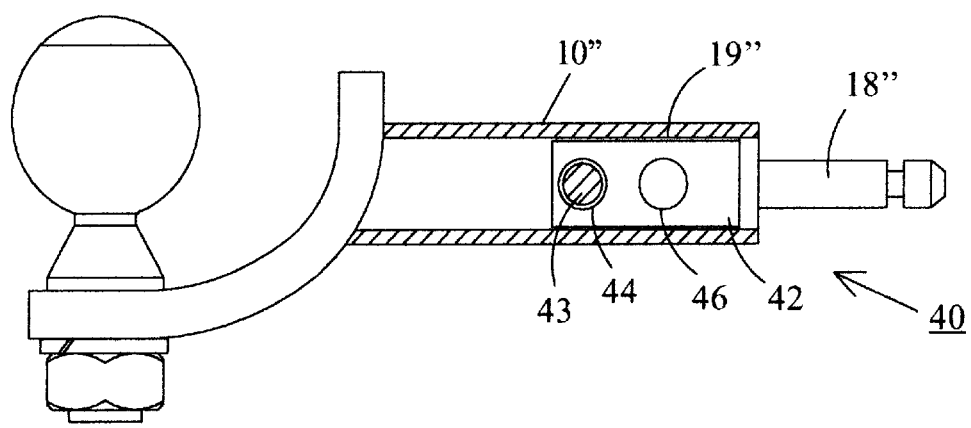
FIG. 4 is a view similar to FIG. 3 showing a stowage adapter installed in the distal end of a ball mount for a class 3 trailer hitch apparatus.

FIG. 4 shows a standard hollow ball mount 10" with a combination linch pin stowage adapter 40 positioned within the hollow distal end 19" of mount 10". Typically ball mount 10" has a square cross section which telescopes within the receiver mounted on the vehicle. Adapter 40 has a body portion 42 which is also square in cross section and is sized to fit within the ball mount distal open end 19". Rod 18" is welded or otherwise fixed to the outer end of body portion 42 as shown. A flat head pin 43 is inserted through hole 22" in mount 10" and corresponding holes 44 in the body of adapter 40 to secure same within the ball mount 10" distal end 19". A second set of holes 46 may be provided in the body portion of adapter 40 to permit at least partial retraction of the rod 18" within ball mount 10" when desired. The configuration shown in FIG. 4 is typical of class 3 & 4 trailer hitch apparatus.

Figure 5:
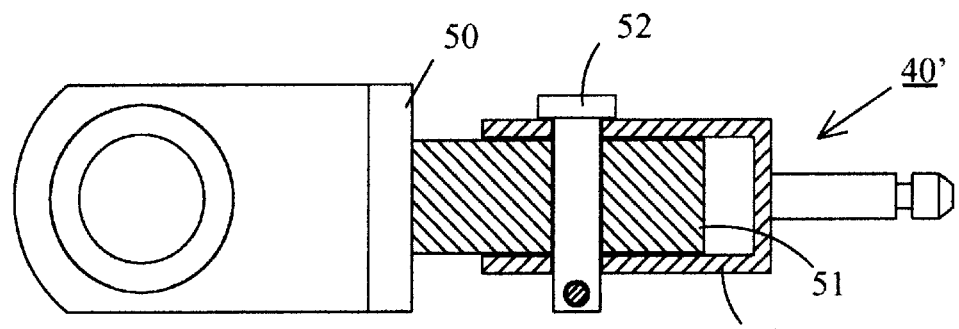
FIG. 5 is a view similar to FIG. 4 but rotated ninety degrees, of a ball mount for a class 2 hitch apparatus.

FIG. 5 shows a typical class 2 application where stowage adapter 40' fits over the usually solid distal end 51 of ball mount 50 and is secured thereto by insertion of pin 52 through corresponding holes in body portion 54 of adapter 40' and ball mount 50.

Figure 6:
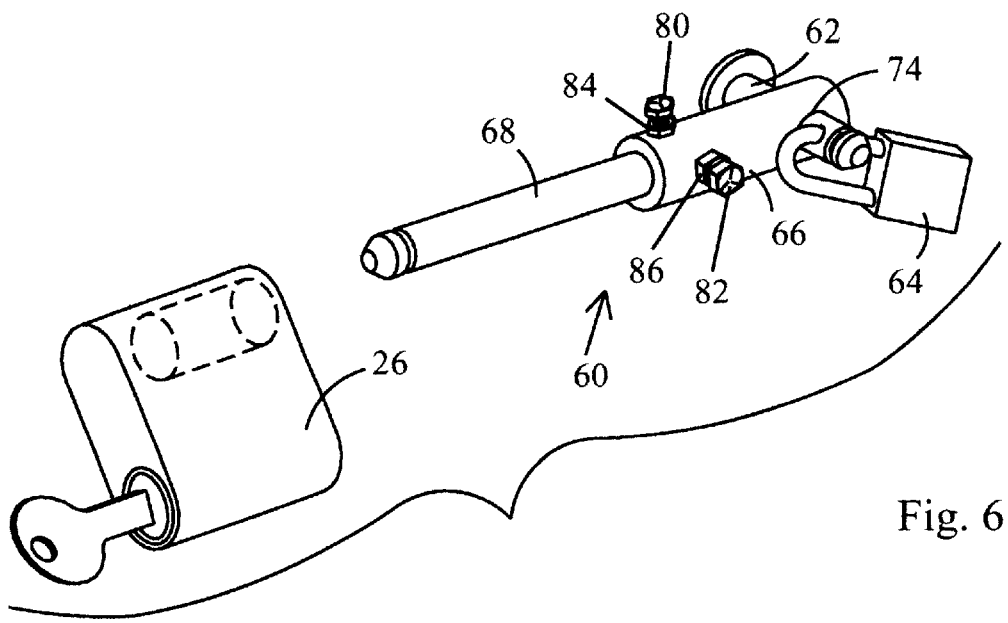
FIG. 6 is a perspective view of a still further embodiment of a combination linch-pin stowage adapter

Referring now to FIG. 6 a combination linch-pin stowage adapter 60 is shown together with a storage pin 62 and padlock 64 for securing adapter 60 in a ball mount. Combination linch-pin adapter 60 includes a cylindrical body portion 66 and a smaller diameter cylindrical rod 68 extending axially therefrom. Rod 68 has a length and diameter similar to rod 18 of the previous embodiments to operatively engage with the ball mounts and receivers of class 3 & 4 hitch assemblies. The outer end of rod 68 has an annular detent 70 adapted to receive the usual hitch clips (not shown) or a latching member such as lock 26 shown in FIG. 2.

Body 66 in addition to having a hole 74 located so as to coincide with the linch-pin holes in the ball mounts such as hole 22 in FIG. 1 also has a pair of threaded holes adjacent the inner end of rod 68. A pair of screws 80 and 82 with lock nuts 84 and 86 are positioned therein. Screws 80 and 82 are positioned so as to minimize movement when adapter 60 is secured in a ball mount hollow end such as 19" FIG. 4. Alternatively body 66 may be made square, hexagonal or other shape to fit the intended ball mount.

In use as a linch-pin, combination adapter 60 is inserted through holes 20 in a receiver and hole 22 in a ball mount inserted into receiver 12 and the assembly secured by use of a lock 26. It should be noted that in this art the linch-pin 60 is sometimes referred to as a "hitch pin". For use as a linch-pin, adapter 60 is typically configured as in FIG. 6 with pin 62 and padlock 64 in place as shown.

In use as a stowage adapter, combination linch-pin stowage adapter 60 has the body portion 66 inserted into the hollow end of a ball mount such as open end 19" of a ball mount 10", FIG. 4, and pin 62 is inserted through aligned holes 44 and 74 to secure the assembly together. The assembly is then stored with a receiver such as 12 in FIG. 1 by inserting rod 68 through holes 20. Lock 26 is then applied to the end of rod 68 to complete the stowage of the ball mount with the vehicle installed hitch apparatus.

The embodiments of FIGS. 3–6 are mounted in an installed hitch receiver in the same manner as shown in FIG. 2. With the stowage adapters shown in FIGS. 1, and 3–6 it is a simple matter to safely and securely stow most any ball mount for a hitch receiver mounted underneath a vehicle, in a retracted but readily available position with the hitch receiver apparatus.

While there are given above certain specific examples of this invention and its application in practical use, it should be understood that they are not intended to be exhaustive or to be limiting of the invention. On the contrary, these illustrations and explanations herein are given in order to acquaint others skilled in the art with this invention and the principles thereof and a suitable manner of its application in practical use, so that others skilled in the art may be enabled to modify the invention and to adapt and apply it in numerous forms each as may be best suited to the requirement of a particular use.

I claim:

1. In a trailer hitch apparatus having an elongated generally hollow hitch receiver for selectively receiving a ball mount member and securing same therein, in operative towing position, by insertion of a pin transversely through corresponding transversely oriented holes in said hollow hitch receiver and said ball mount member; stowing means for attachment to the distal end of said ball mount member comprising:

a rod member having first and second ends and a length greater than the transverse dimension of said hollow hitch receiver adjacent said corresponding transversely oriented holes;

said rod member having a cross section size and shape suitable for insertion through said corresponding transversely oriented holes in said hollow hitch receiver;

means for securing said first end of said rod member to the distal end of a ball mount member;

means adjacent the second end of said rod member for permitting attachment of a latching member;

whereby when said rod member is secured to the distal end of said ball mount member said ball mount member may be selectively stored in a non operative position on said hitch receiver by inserting said rod member through said corresponding transversely oriented holes in said receiver member and secured thereto by said latching member affixed to the second end of said rod member.

2. The invention as claimed in claim 1 wherein said rod member is welded to the distal end of said ball mount member to form an extension along the longitudinal axis of said ball mount member.

3. The invention as claimed in claim 1 further including said ball mount member being adapted to telescopically fit within said hitch receiver;

an elongated recess in the distal end of said ball mount member; and said means for securing the second end of said rod member to the distal end of said ball mount includes spring and bail members positioned within said recess in the distal end of said ball mount connected to said second end of said rod to mount said rod member within said recess in the distal end of said ball mount member for extension from and retraction into said recess.

4. The invention as claimed in claim 1 wherein said means for securing said first end of said rod member to the distal end of said ball mount member includes;

a body portion fixed to said first end of said rod member;

said body portion having a cross section formed to telescopically engage with the distal end of said ball mount member;

a transverse hole formed in said body portion to align with a corresponding hole in the distal end of said ball mount member when telescopically engaged therewith; and pin means positioned in said transverse body portion hole and said ball mount corresponding hole.

5. The invention as claimed in claim 4 wherein:

said hollow hitch receiver has a square cross section;

said ball mount member is hollow and has a square cross section adapted to telescopically fit within said hitch receiver;

said body portion has a square cross section adapted to telescopically fit within the distal end of said ball mount member;

a transversely oriented hole is formed in said body portion and is sized and positioned to align with a corresponding transversely oriented hole in said ball mount member; and a pin member is inserted through said body portion hole and ball mount member hole to secure said stowing means and ball mount member together.

6. The invention as claimed in claim 5 wherein said body portion has a hollow square cross section adapted to telecopically receive therein the distal end of said ball mount member.

7. The method of forming a stowable ball mount member for stowage in a non operative position with a hitch receiver in a trailer hitch apparatus having a hitch receiver member with at least one transverse linch-pin hole, mounted on a towing vehicle and a ball mount member that operatively engages with said hitch receiver to position a tow ball in towing position which comprises:

forming an elongated rod member forming said elongated rod member with a cross sectional size and shape to permit insertion through said at least one linch-pin hole; and attaching said rod member to the distal end of said ball mount member;

whereby when not in use said ball mount member of said trailer hitch apparatus may be maintained in association with its trailer hitch apparatus in a retracted, non hazardous position by inserting said rod member, with attached ball mount member, into said at least one linch-pin hole.

8. The invention as claimed in claim 7 further including:

forming said elongated rod member with a length greater than the transverse width of said hitch receiver adjacent said at least one linch-pole hole;

inserting said elongated rod member into said at least one linch-pin hole in said hitch receiver; and securing said elongated rod member from unintentional withdrawal from said transverse linch-pin hole.

9. The invention as claimed in claim 7 further including:

forming a stowage adapter body portion to operatively mate with the distal end of a ball mount member on one end;

fixing said rod member to the other end of said body portion; and securing said stowage adapter body portion to said ball mount member.

10. A combination linch-pin and stowage adapter device for use with a trailer hitch apparatus having an elongated hitch receiver member and a ball mount member having the distal end formed to mate with said hitch receiver and a series of holes in said receiver and said ball mount member at least some of which are adapted to receive a pin therethrough to secure said ball mount member to said hitch receiver comprising in combination:

a body portion having first and second ends;

a rod member fixed on said body portion first end having a length and cross section size and shape to permit insertion through at least one of said holes in said hitch receiver; and means for securing said body second end portion to the distal end of said ball mount member;

whereby when said adapter device is secured to said ball mount member the assembly may be stowed in non operative position adjacent the hitch receiver by inserting said rod member into at least one of the holes in said hitch receiver member.

11. The invention as claimed in claim 10 wherein said rod member has a length and cross sectional size and shape to permit insertion through corresponding holes of said series of holes in said receiver and ball mount members when said ball mount member is operatively inserted into said receiver member, to secure said ball mount member in operative towing position in said trailer hitch apparatus.

12. The invention as claimed in claim 10 wherein said receiver member and ball mount member have a rectangular cross section;

said body portion has a cross section sized to mate with the distal end of said ball mount member; and said rod member has a circular cross section to mate with said holes in said receiver and ball mount members.

13. The invention as claimed in claim 12 wherein said body portion has a rectangular cross section.

14. The invention as claimed in claim 12 wherein said body portion has a circular cross section.

15. The invention as claimed in claim 12 wherein said body portion has a polygonal cross section.

16. The invention as claimed in claim 14 wherein said body cross section has a diameter greater than the diameter of said rod member and less than the interior dimension of said rectangular cross section ball mount member.

17. The invention as claimed in claim 10 wherein said hitch receiver has a square cross section;

said ball mount member has at the distal end a square cross section adapted to telescopically fit within said hitch receiver;

said combination linch-pin stowage adapter body portion has a square cross section adapted to telescopically fit within the distal end of said ball mount member;

a transversely oriented hole is formed in said adapter body portion and is sized and positioned to align with a corresponding transversely oriented hole in said ball mount member; and an elongated stowage pin member is inserted through said body portion hole and ball mount member hole to secure said stowage adapter and ball mount member together.

18. The invention as claimed in claim 17 wherein said stowage adapter body portion is sized to telescopically fit over the distal end of said ball mount member.

19. In a trailer hitch apparatus having an elongated generally hollow hitch receiver for selectively receiving a ball mount member and securing same therein, in operative towing position, by insertion of a pin transversely through corresponding transversely oriented holes in said hollow hitch receiver and an operably installed ball mount member, a stowable ball mount member comprising:

an elongated body portion having first and second ends;

a hitch ball mounting plate and hole formed on said first end of said body portion to selectively receive a hitch ball;

said second end of said body portion having a cross section shape and size adapted to fit within said hollow hitch receiver;

a transversely oriented hole formed in said body portion adjacent said second end to coincide with a pair of transverse holes in said hitch receiver when said ball mount is inserted therein;

an elongated rod member secured to said second end of said body portion; and said rod member having a cross section shape and size to permit insertion into the transversely oriented holes in a hollow hitch receiver.

20. The invention as claimed in claim 19 wherein said rod member extends longitudinally along the axis of said ball mount body portion; and hole and groove means are formed in the distal end of said rod member to cooperate with latching means when said ball mount member is positioned in non operative position on said receiver by insertion of said rod member through said hitch receiver transversely oriented holes.

* * * * *